(12) United States Patent
Agashe et al.

(10) Patent No.: US 6,778,885 B2
(45) Date of Patent: Aug. 17, 2004

(54) APPARATUS, METHOD, AND SYSTEM OF TRANSFERRING CORRECTION INFORMATION

(75) Inventors: Parag Agashe, San Diego, CA (US); Giovanni Vannucci, Red Bank, NJ (US)

(73) Assignees: Qualcomm Inc., San Diego, CA (US); Lucent Technologies

(*) Notice: Subject to any disclaimer, the term of this patent is extended or adjusted under 35 U.S.C. 154(b) by 174 days.

(21) Appl. No.: 09/910,365

(22) Filed: Jul. 20, 2001

(65) Prior Publication Data

US 2002/0068997 A1 Jun. 6, 2002

Related U.S. Application Data

(60) Provisional application No. 60/241,191, filed on Oct. 16, 2000.

(51) Int. Cl.$^7$ ............................. G06F 7/00; H04B 7/185
(52) U.S. Cl. ..................... 701/13; 701/226; 342/357.02; 342/358; 455/13.2
(58) Field of Search ................................. 701/221, 224, 701/226, 13, 4, 213, 215, 214, 217; 342/463, 355, 356, 358, 352, 357.02, 357.06, 357.09, 357.12, 357.08; 455/12.1, 13.1, 13.2, 13.3; 244/158 R

(56) References Cited

U.S. PATENT DOCUMENTS

| | | | |
|---|---|---|---|
| 5,504,492 A | * 4/1996 | Class et al. | 342/357.06 |
| 5,731,786 A | * 3/1998 | Abraham et al. | 342/357.08 |
| 5,884,220 A | * 3/1999 | Farmer et al. | 701/215 |
| 5,910,788 A | * 6/1999 | Class | 342/357.02 |
| 5,913,170 A | * 6/1999 | Wortham | 455/457 |
| 6,058,338 A | * 5/2000 | Agashe et al. | 701/13 |
| 6,061,632 A | * 5/2000 | Dreier | 701/215 |
| 6,134,483 A | * 10/2000 | Vayanos et al. | 701/13 |
| 6,415,229 B1 | * 7/2002 | Diekhans | 701/214 |

FOREIGN PATENT DOCUMENTS

WO          0048017          8/2000  ............. G01S/5/14

* cited by examiner

Primary Examiner—Jacques H. Louis-Jacques
(74) Attorney, Agent, or Firm—Philip Wadsworth; Charles Brown; Richard Bachand

(57) ABSTRACT

Apparatuses, methods, and systems of transferring correction information are described. In certain implementations, correction factors relate to stored or calculated values, and a correspondence between a correction factor and a value is indicated by a predetermined order of the correction factors. In one application, a method according to an embodiment of the invention is used to transmit correction factors relating to the positions of physical objects. For example, such a method may be used to transmit correction factors relating to the positions of space vehicles within a Global Positioning Satellite ('GPS') system.

54 Claims, 16 Drawing Sheets

APPARATUS, METHOD, AND SYSTEM OF TRANSFERRING CORRECTION INFORMATION

CROSS REFERENCE

This application claims priority to U.S. Provisional Application No. 60/241,191, filed Oct. 16, 2000.

BACKGROUND OF THE INVENTION

1. Field of the Invention

The present invention relates to information for correction of stored or calculated values and the transfer thereof.

2. Description of Related Art

Ease and accuracy of position determination has increased significantly since the development of positioning technologies such as global positioning satellite ('GPS') systems. One example of a system of positioning satellites is the NAVSTAR GPS system (as described in Global Positioning System Standard Positioning Service Signal Specification, $2^{nd}$ edition, Jun. 2, 1995, United States Coast Guard Navigation Center, Alexandria, Va.); another example is the GLONASS GPS system maintained by the Russian Republic. GPS receivers are currently available for use in aircraft, ships, ground vehicles, and for hand carrying by individuals.

The NAVSTAR GPS system currently comprises twenty-four satellites or 'space vehicles' ('SVs') that orbit the earth in six orbital planes (four satellites in each plane). The SV orbits repeat substantially the same ground track as the earth turns beneath them each day. The orbital planes are equally spaced and inclined with respect to the equatorial plane, thus ensuring that a line-of-sight path exists to at least five SVs from any (unobstructed) point on the earth.

Ground-based monitor stations measure signals from the SVs and incorporate these measurements into orbital models for each satellite. Navigation data and SV clock corrections are computed for each satellite from these models and uploaded to each SV. The SV then transmits information relating to its position by modulating a direct sequence spread spectrum signal having a chip rate of 1.023 MHz onto a 1.5-GHz carrier.

A GPS receiver calculates its position by combining the delay or phase of the signal received from the SV, which indicates the position of the receiver relative to the SV, with information relating to the position of the SV. Because of inaccuracies in the receiver's timebase oscillator, signals from at least four SVs are required to resolve a position in three dimensions, although signals from additional SVs (if available) may be used to provide better accuracy.

It is desirable to augment certain wireless systems for mobile communications by adding the capability to locate the position of a particular mobile unit. One reason is a regulation promulgated by the Federal Communications Commission (FCC) (Docket No. 94-102, Third Report and Order adopted Sep. 15, 1999, released Oct. 6, 1999) which requires all cellular carriers in the United States to be able to locate the position of a cellular telephone making an emergency 911 ('E-911') call within 50 meters for 67 percent of calls and within 150 meters for 95 percent of calls by October 2001. Other uses for position location capability in wireless communications systems include value-added consumer features such as navigation and vehicle fleet management support.

SUMMARY

In a method according to an embodiment of the invention, correction factors are transferred in a predetermined order. From this predetermined order, the particular stored or calculated values to which each correction factor relates may be identified.

DETAILED DESCRIPTION

A method according to an embodiment of the invention as disclosed herein may be applied to any situation in which it is desirable for an entity to transfer information relating to a set of items (e.g. to a storage medium or device or via transmission to another entity). The set of items may include physical objects (such as satellites, people, etc.), and the information is transferred in a predetermined order such that a need to include labels or a similar mechanism to explicitly indicate correspondences between the information and the individual items is avoided. If a time-varying ambiguity may exist in the order as applied by a receiving or retrieving entity, the sending or storing entity may predict the ambiguity and adjust the time of applicability of the data that it sends accordingly. For example, a sending entity may predict how a receiving entity will apply the predetermined order to the set of items and may choose a specific time of validity at which no ambiguity in the order as applied by the receiving entity is expected.

Figure 1:
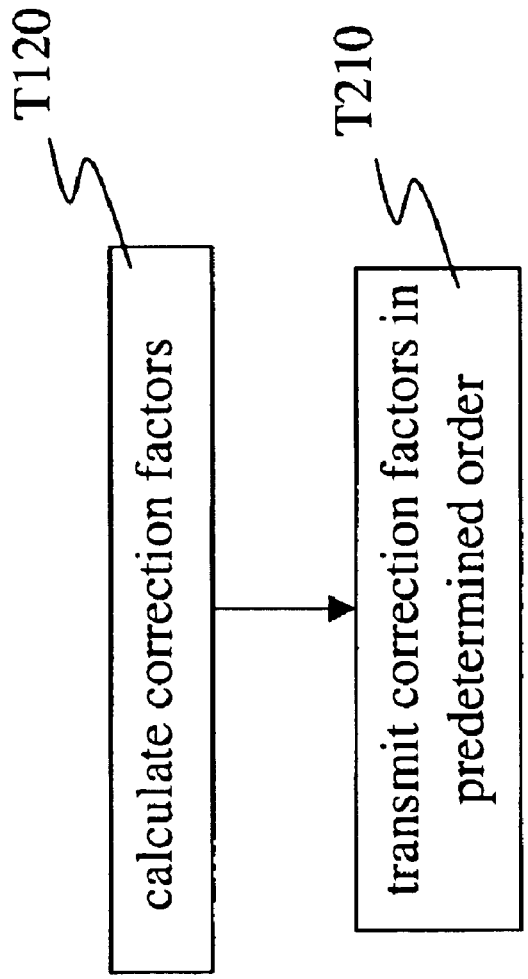
FIG. 1 shows a flowchart for a method according to an embodiment of the invention.

FIG. 1 shows a flowchart for a method according to an embodiment of the invention. In task T120, correction factors are calculated. Each of these factors relates to one or more among a set of items. In task T210, the correction factors are transmitted in a predetermined order. The predetermined order may be based on absolute or relative values indicating the positions (or expected positions) of the items, or on identification numbers of the items, or on some other characteristic by which the items may be distinguished from each other. The correction factors may be calculated and transmitted individually (i.e. in a serial or pipelined fashion), or one or more factors may be calculated and/or transmitted in parallel.

Figure 2:
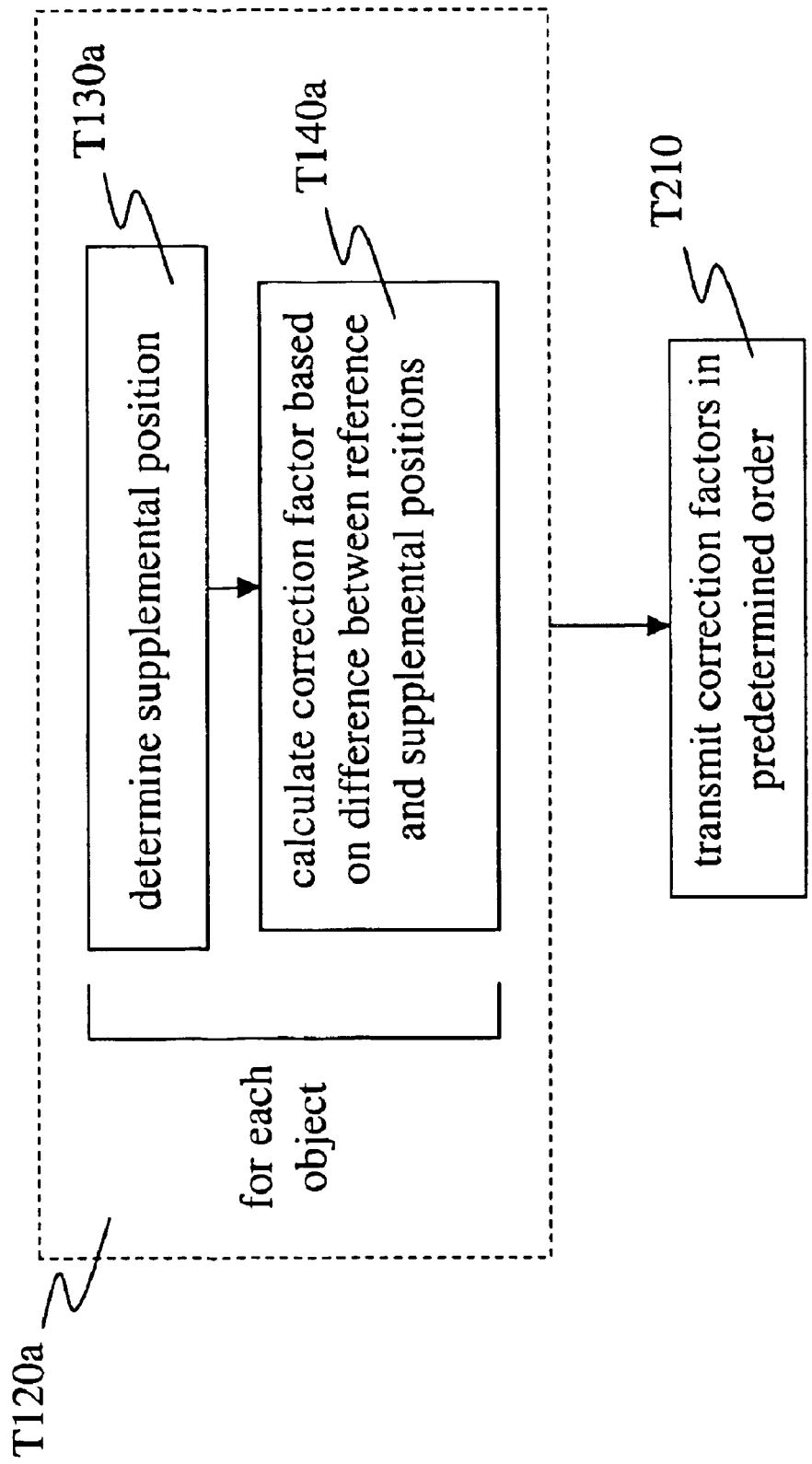
FIG. 2 shows a flowchart for a method according to an embodiment of the invention.

FIG. 2 shows a flowchart for a method according to another embodiment of the invention. In task T120a, correction factors are calculated for each among a set of physical objects. This set of objects may be a subset of a larger set of objects: for example, the set may include only those GPS SVs that are determined to be visible from a predetermined location or area. In task T130a, a supplemental position is determined for each object. This determination may be based upon observation of the object and/or a signal received from an object or another entity.

In task P140a, a correction factor is calculated for each object that is based on a difference between the supplemental position and a reference position for the object. The reference position may be effective at a different time than the supplemental position, and the reference position may have been calculated using a less accurate method and/or from a less accurate basis. Depending upon the particular implementation, task T120a may be performed serially for each among the set of objects or in parallel (i.e. for more than one object at a time).

Figure 3:
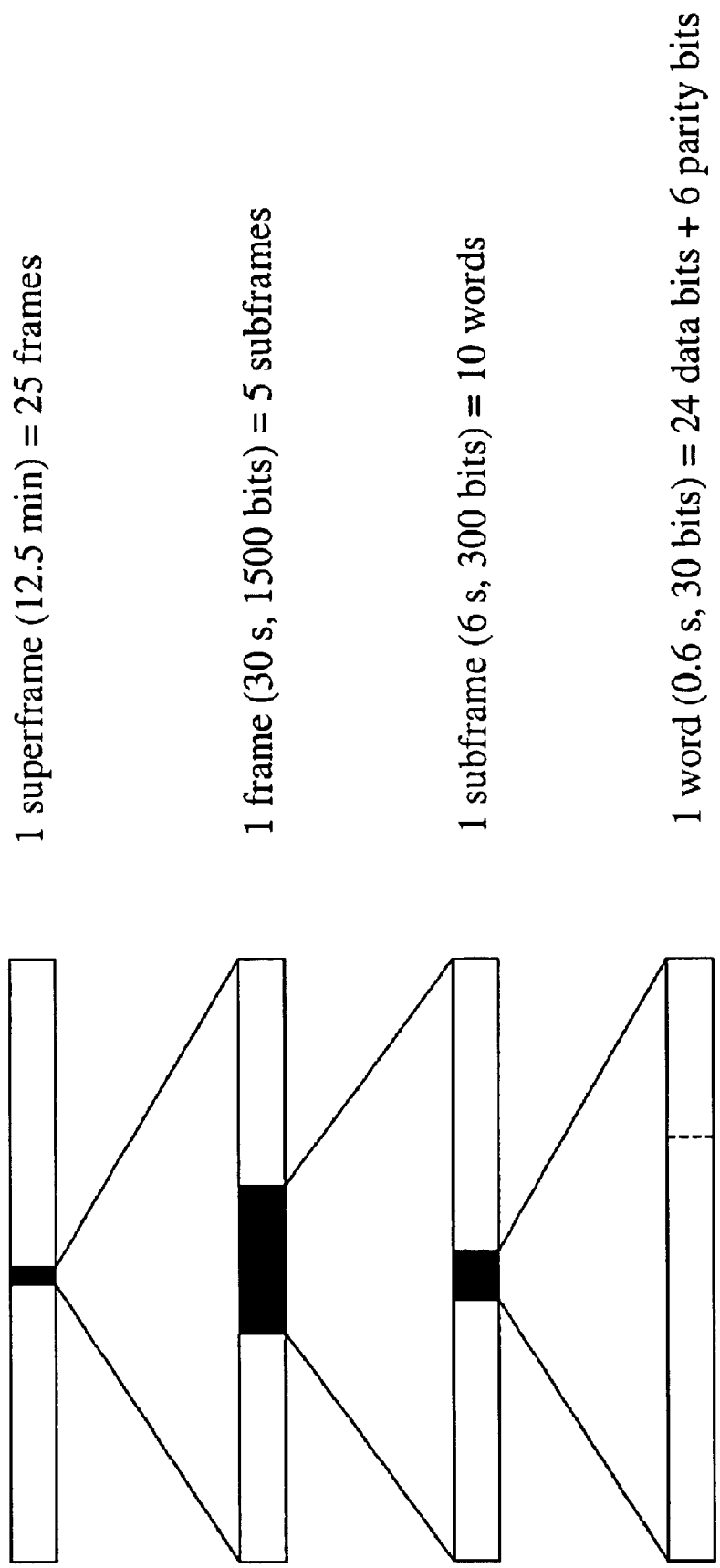
FIG. 3 shows a structure of a GPS data stream.
Figure 4:
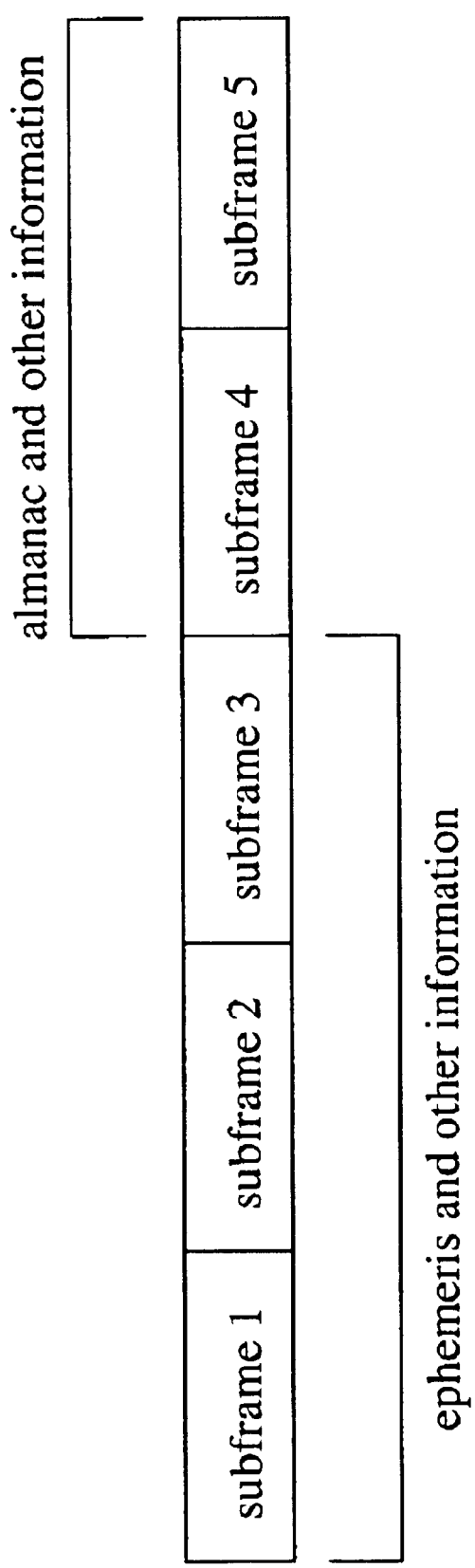
FIG. 4 shows a format of a GPS data frame.

In an exemplary implementation of a method as shown in FIG. 2, one basis for determination of reference and supplemental positions is GPS navigation data as transmitted by one or more SV. Such data includes a series of time-tagged data bits that mark the time of transmission of each subframe from the SV. As shown in FIG. 3, a GPS data frame consists of 1500 bits transmitted over a period of 30 seconds (i.e., at a rate of 50 bits per second). Each data frame is divided into five 300-bit subframes, each having a duration of six seconds. As illustrated in FIG. 4, the first three subframes of a frame contain orbital and clock data: SV clock corrections are sent in subframe 1 and precise orbital data sets (or 'ephemeris information') for the transmitting SV are sent in subframes two and three. The ephemeris information is repeated at every frame.

Subframes four and five are used to transmit almanac and other information. Unlike the ephemeris information, almanac information includes an orbital data set that is common to all of the SVs. Almanac information is less precise with respect to an individual SV than the ephemeris information, and in order to transmit a complete almanac, an entire set of twenty-five frames (also called a superframe and having a transmission period of 12.5 minutes) is required. (See, e.g., Global Positioning System: Theory and Applications (Volume I), edited by B. W. Parkinson and J. J. Spilker Jr., 1996, for a more detailed description of the NAVSTAR GPS system.)

Ephemeris information provides a very accurate description of the orbit of a SV. However, it is possible that an entity such as a mobile unit will have access only to the less accurate almanac information (e.g. because of bandwidth constraints). For an application such as E-911 position determination, a position as calculated only on the basis of almanac information may be unacceptably inaccurate. In such a case, it is desirable to provide the mobile unit with a correction factor that indicates a difference between a position calculated only on the basis of almanac information and a position calculated on the basis of ephemeris information.

Figure 5:
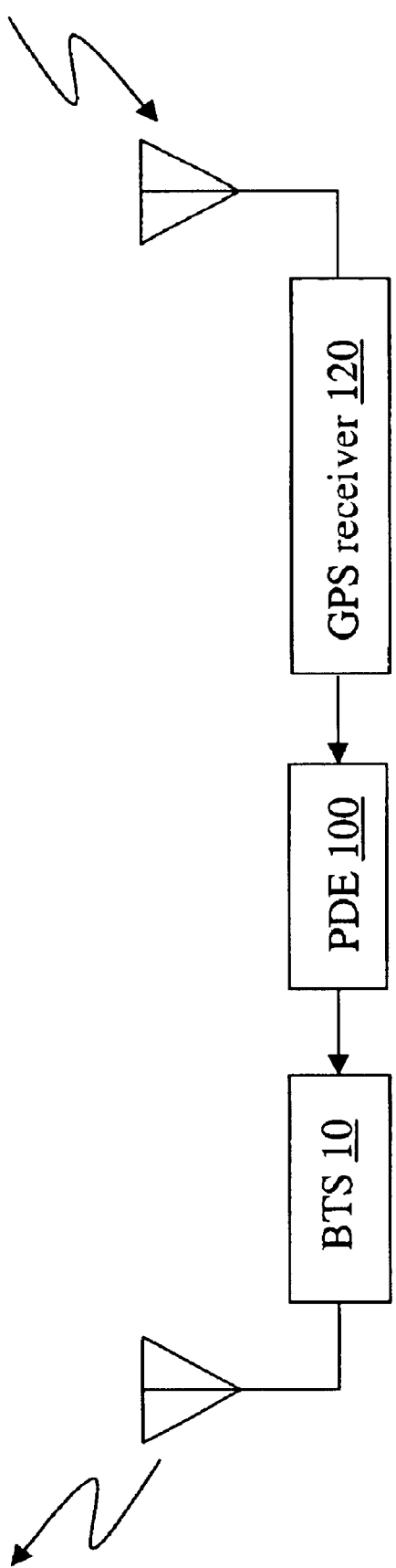
FIG. 5 shows a block diagram for a system according to an embodiment of the invention.

FIG. 5 shows a block diagram for a system according to an embodiment of the invention. GPS receiver 120 receives almanac and ephemeris information from one or more SVs and forwards this information to PDE 100. In one implementation, PDE 100 forwards at least a portion of the almanac information to one or more mobile units (not shown) via base station transceiver ('BTS') 10, which may be part of an existing cellular telephone system. In another implementation, the mobile units receive almanac information directly from the SVs. Based on at least the almanac and ephemeris information, PDE 100 calculates correction factors and forwards them to the mobile units via BTS 10.

Figure 6:
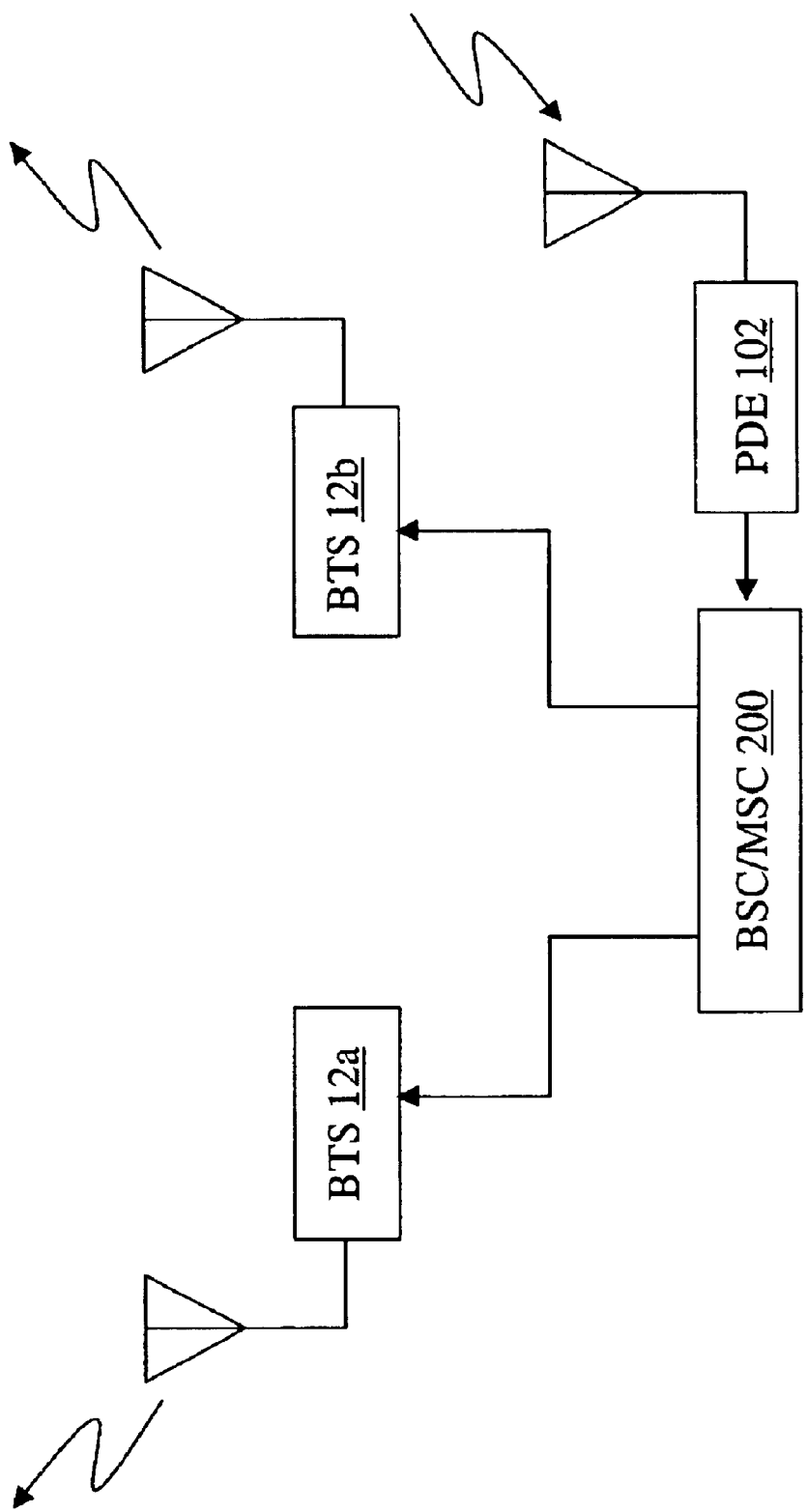
FIG. 6 shows a block diagram for a system according to an embodiment of the invention.

FIG. 6 shows a block diagram for a system according to another embodiment of the invention. In this example, PDE 102 (which includes an integrated GPS receiver) provides position determination support via several BTSs 12a, 12b through a base station controller or mobile switching center 200, which may be part of an existing cellular telephone system. In other embodiments, a PDE (with or without an integrated GPS receiver) may be incorporated into a MSC, BSC, and/or BTS.

Almanac correction data is unique to each SV. If the size of messages transmitted between the base station and the mobile unit was not limited, then it does not matter how much data was transmitting between the two devices. The SV identification (ID) number could be used to label the correction for each satellite, for example, SV ID 1 indicating that the following correction data applies to satellite 1, SV ID 2 indicating that the next correction data applies to satellite 2, etc.

Transmitting labels, however, consumes some of what may be a limited number of bits provided within a GPS navigation message. An advantage of obviating a need for labeling bits is especially desirable in a low data rate system such as the analog Advanced Mobile Phone System (AMPS), in which data link capacity may be very limited.

Figure 7:
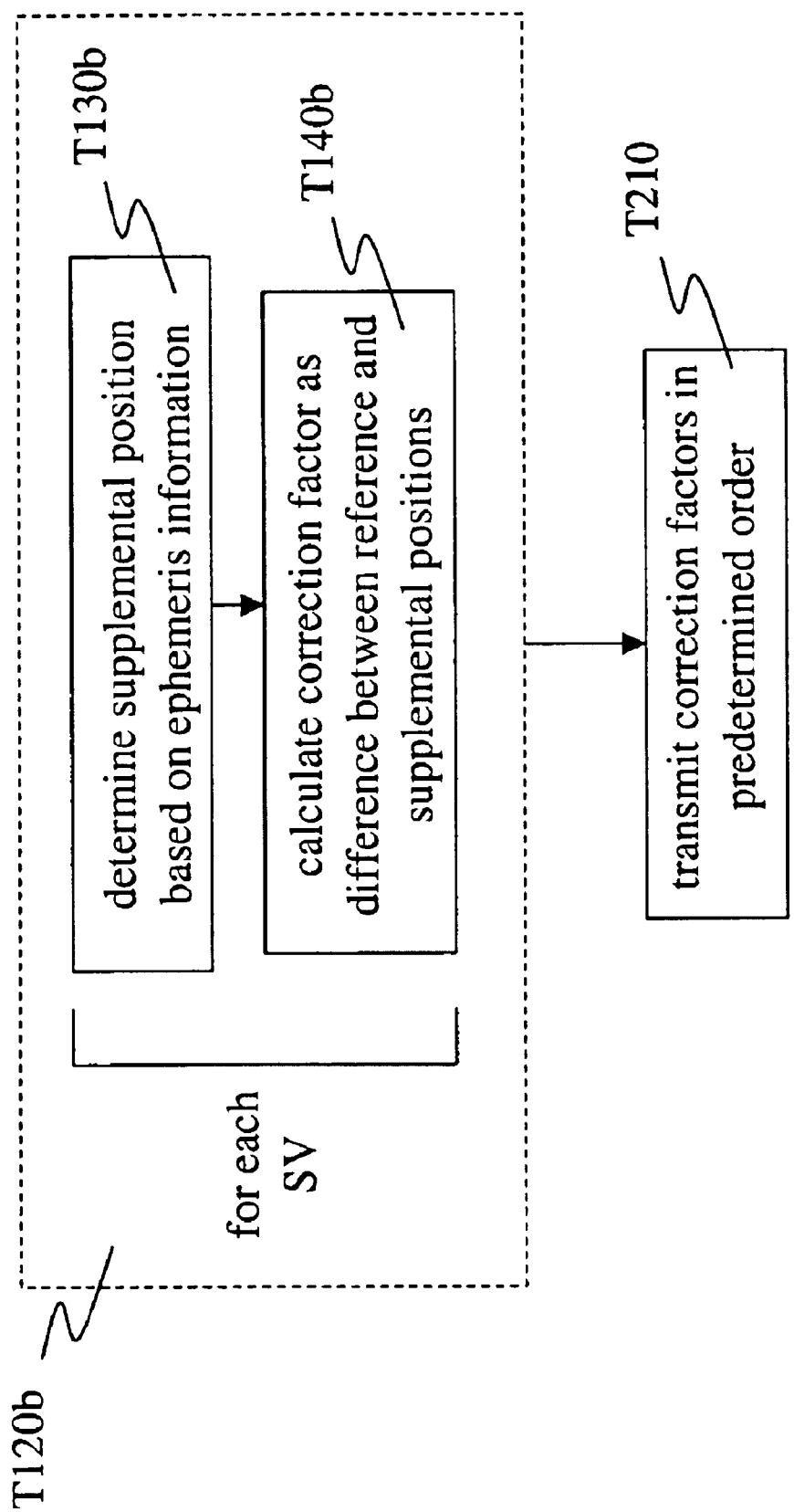
FIG. 7 shows a flowchart for a method according to an embodiment of the invention.

FIG. 7 shows a flowchart for a method according to an embodiment of the invention. In task T120b, correction factors are calculated for each among a set of SVs. In task T130b, a supplemental position is determined for each SV, which determination is based at least partially upon ephemeris information received from the SV.

In task P140b, a correction factor is calculated for each SV that is based at least partially on a difference between the supplemental position and a reference position for the SV. In an exemplary implementation, the reference position is determined based at least partially upon almanac information received from the SV and/or other SVs. Depending upon the particular implementation, task T120b may be performed serially for each SV or in parallel (i.e. for more than one SV at a time). Further to the examples indicated above, the predetermined order used in task T210 may relate to the elevation angles, azimuths, or assigned identification numbers of the SVs. All or a portion of a method as shown in FIG. 7 may be initiated in response to a request from a mobile unit for correction information (for example, a Request for GPS Almanac Correction as described in TIA/EIA Interim Standard (IS) IS-801, Telecommunications Industry Association, Arlington, Va., November 1999).

Figure 8:
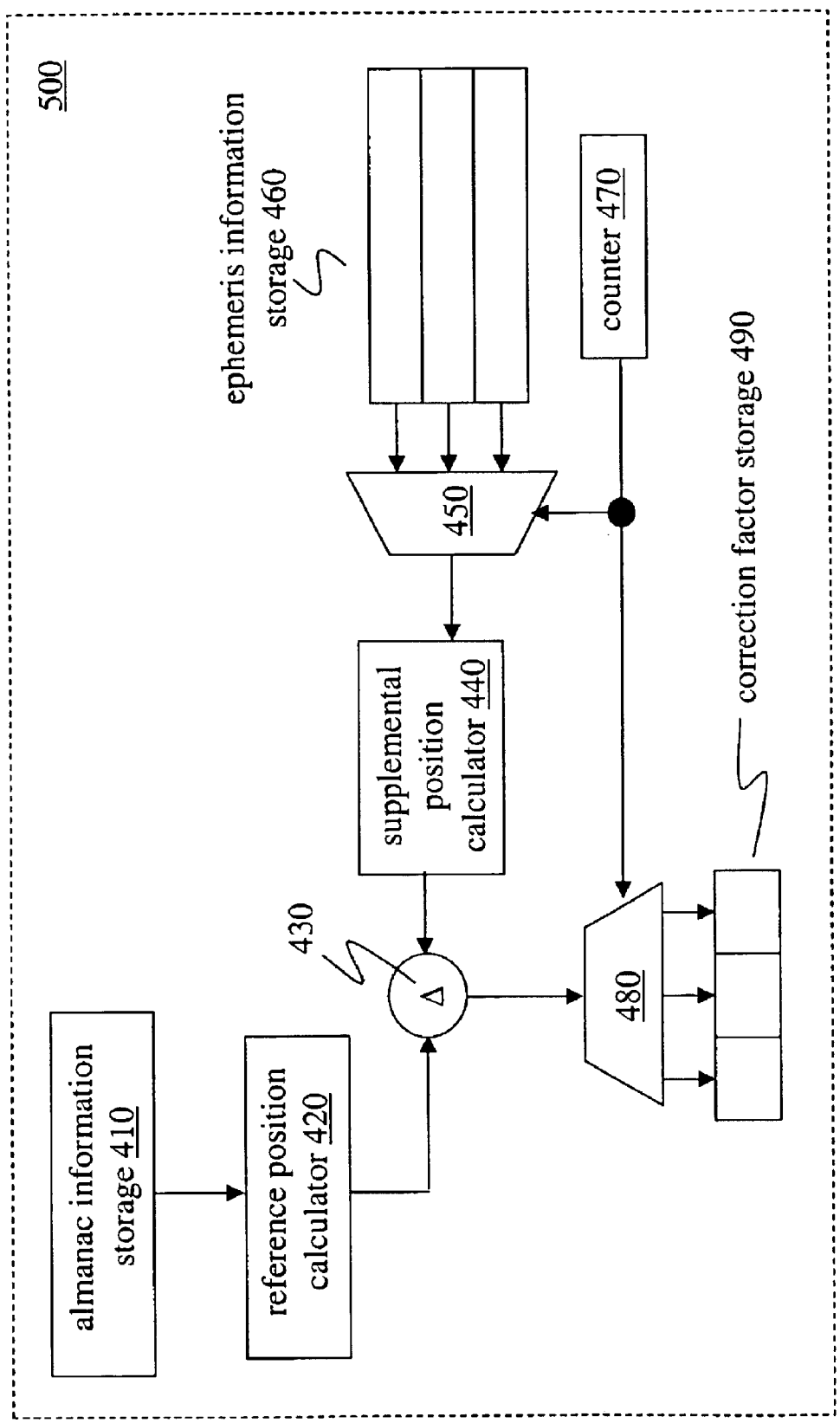
FIG. 8 shows a block diagram for an apparatus according to an embodiment of the invention.

FIG. 8 shows a block diagram for a position determining entity (PDE) 500 according to an embodiment of the invention. Almanac information received from one or more SVs is stored in almanac information storage 410. On the basis of the stored almanac information, reference position calculator 420 calculates a reference position for a selected SV and presents the position determination to combiner 430.

Figure 9:
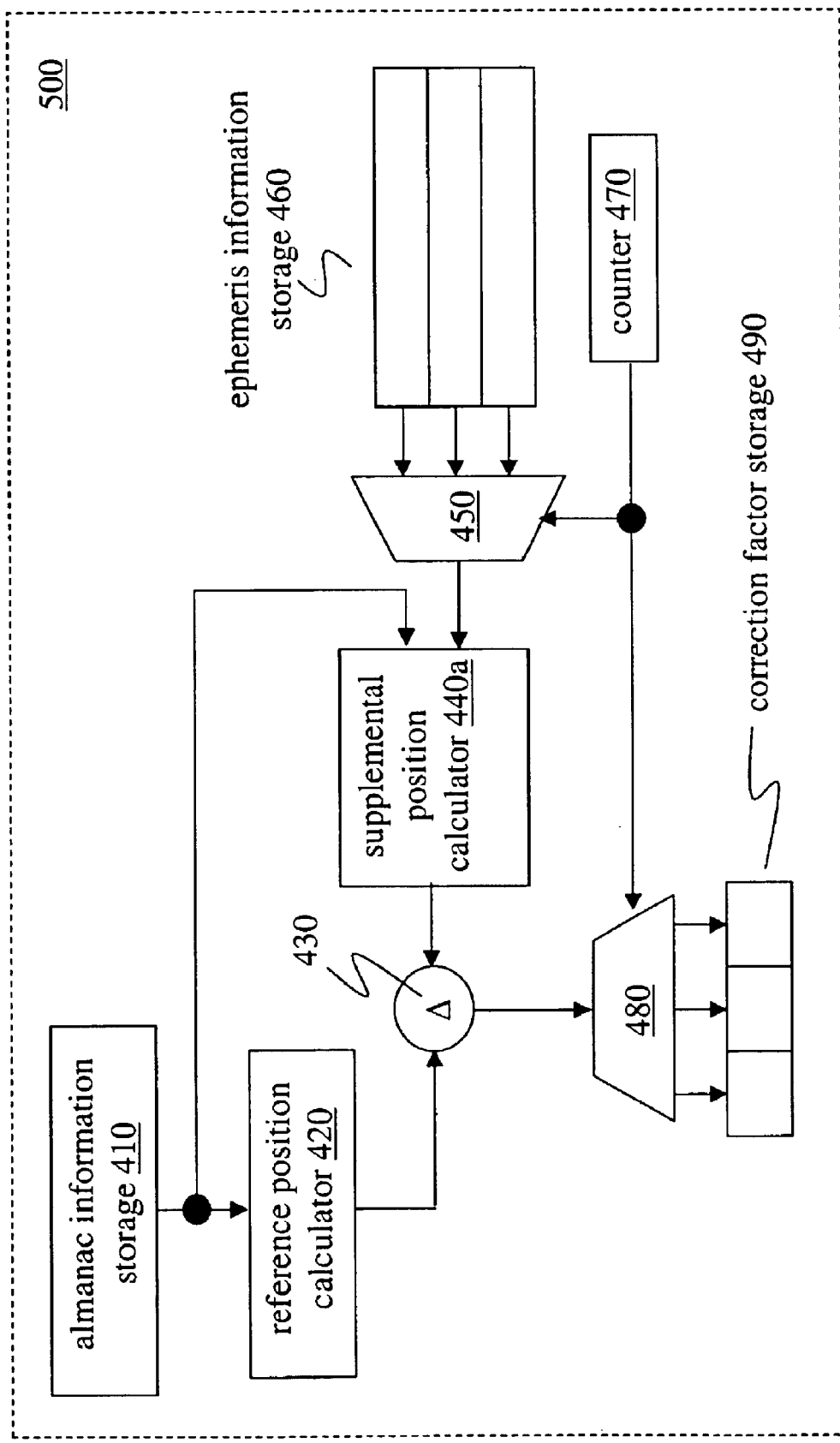
FIG. 9 shows a block diagram for an apparatus according to an embodiment of the invention.

Ephemeris information received from several SVs is stored in corresponding portions of ephemeris information storage 460. Under the control of counter 470, many-to-one multiplexer 450 passes stored ephemeris information for a selected SV to supplemental position calculator 440. On the basis of the selected ephemeris information, supplemental position calculator 440 calculates a supplemental position for the selected SV (as shown in FIG. 9, a supplemental position calculator 440a may calculate a supplemental position on the basis of both almanac and ephemeris information). The operations of reference position calculator 420, supplemental position calculator 440, and multiplexer 450 are coordinated (either synchronously or asynchronously) so that reference and supplemental positions for the same SV are presented contemporaneously to combiner 430.

Combiner 430 outputs a correction factor as the computed difference between the reference and supplemental positions. In a related implementation, the correction factor may be a truncated, rounded, or scaled version of this computed difference. One-to-many demultiplexer 480 is controlled (e.g. by counter 470) to direct the correction factor to a corresponding location within correction factor storage 490 according to a predetermined order as described herein. In a related implementation, different counters (or other coordination mechanisms) may be used to control multiplexer 450 and demultiplexer 480 to compensate for path delays (e.g. a latency within supplemental position calculator 440 or 440a). In another example, wherein demultiplexer 480 and correction factor storage 490 may be omitted, the calculated correction factors are forwarded directly to a transmitter (not shown).

Note that although the same number of storage locations are coincidentally indicated in FIG. 8 within ephemeris information storage 460 and correction factor storage 490, it is not necessary for a correction factor to be computed for every SV for which ephemeris information is stored. However, it may be desirable to construct such a PDE such that each correction factor storage location within correction factor storage 490 corresponds to an ephemeris information storage location within ephemeris information storage 460.

The PDE computes two locations for a SV at a particular moment of time: one location is computed using only almanac data, and one location is computed using ephemeris and almanac data. The PDE then generates the almanac correction data (i.e., the error between the two computed locations at the given moment) and forwards this data to the mobile unit.

In a method according to an embodiment of the invention, almanac correction data is sent to a mobile unit without sending the SV IDs. The PDE forwards almanac data to the mobile units, then it forwards almanac correction data for all the satellites in view to the mobile unit without including the satellite IDs. The base station conveys a reference time and a reference location where the correction data is valid. The satellites are arranged in a predetermined order (increasing or decreasing order of elevation or azimuth angles or some other order). The PDE knows which almanac data the mobile unit has in its memory, and the reference time and reference location for which the list of visible satellites will be computed in the mobile unit. Using this information, the base station can predict the exact order that will be computed in the mobile unit, and sends the correction data for the visible satellites in that order.

As one example of an implementation of a method according to an embodiment of the invention, the corrections are arranged in an increasing order of elevation angle such that by informing the mobile unit of the arrangement, the mobile unit knows which almanac correction data belongs to which SV because it has the list of satellites that it computed using the increasing order of elevation angles. That is, the base station ranks the order of the SV according to elevation angles and then conveys the parameters to the mobile unit in the same order as the order of elevation angles. Other embodiments include increasing or decreasing order of SV IDs in view in some prearranged fashion that can be computed both at the base station and the mobile unit.

Ambiguities in position determination may arise that cause the transmitting entity (e.g. a PDE) to associate correction factors with the objects (e.g. SVs) in a different manner than a receiving entity (e.g. a mobile unit). For example, in a situation where the predetermined order relates to the elevation angles of SVs, factors such as the use of different algorithms, different precision data and/or arithmetic, and rounding may cause a mobile unit to interpret the positions of two closely positioned SVs to be in a different order than that determined by the PDE. Such a confusion may lead to a mobile unit applying a correction factor to the wrong reference position.

Figure 10:
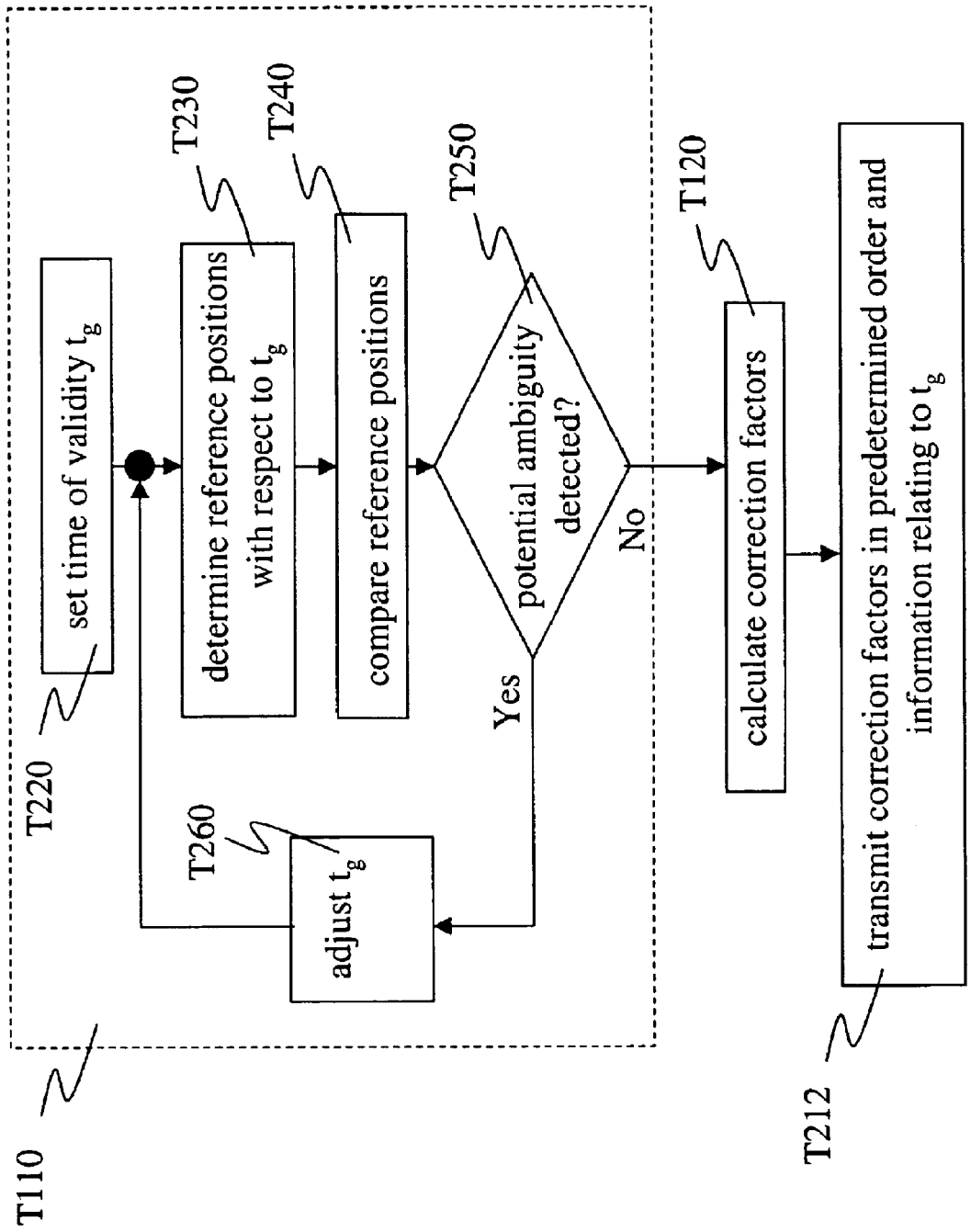
FIG. 10 shows a flowchart for a method according to an embodiment of the invention.

FIG. 10 shows a flowchart for a method according to an embodiment of the invention. In task T110, sets of reference positions are screened to identify a set of positions that has an acceptably low potential for ambiguity and a time of validity corresponding to that set.

Figure 11:
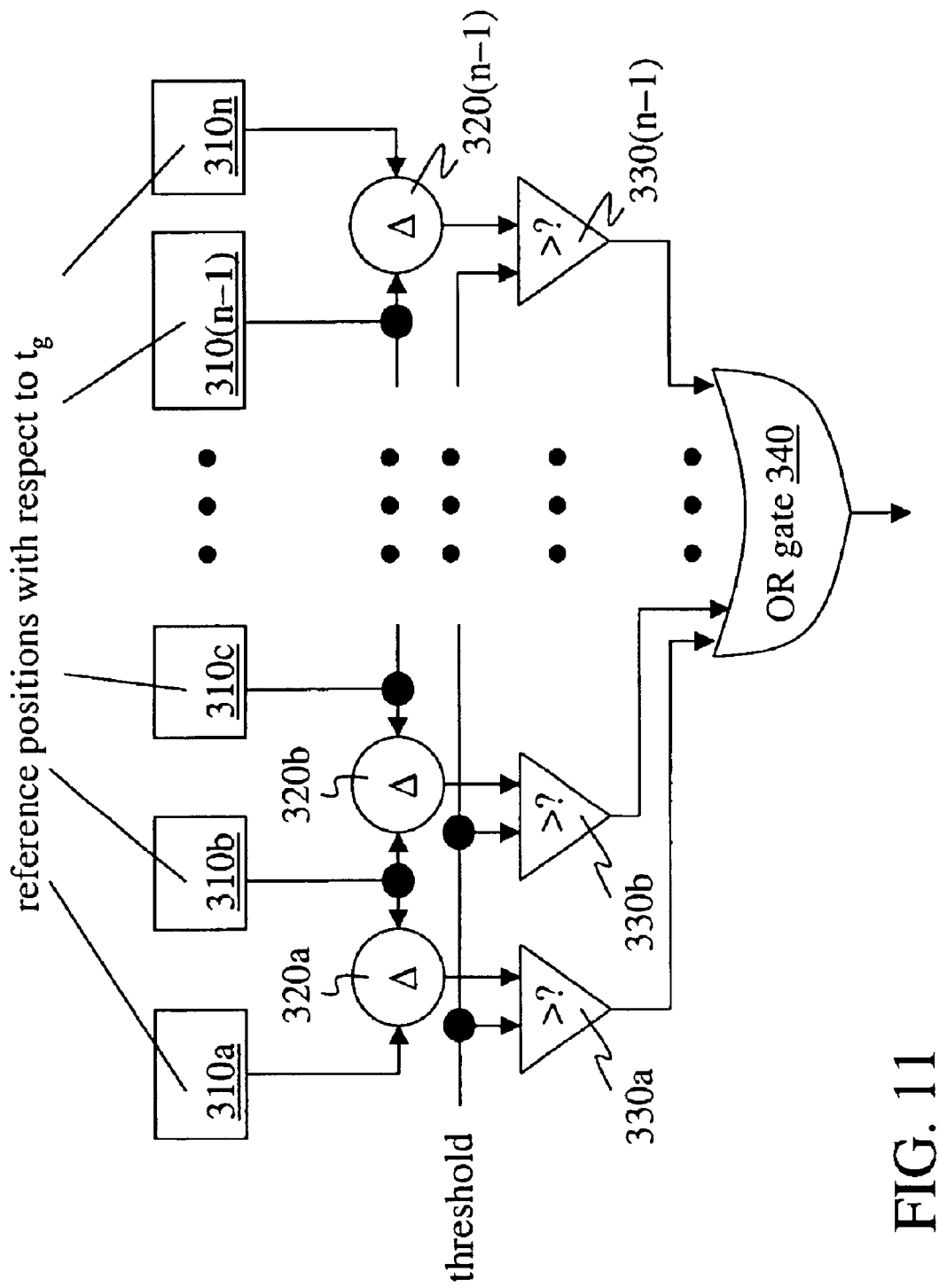
FIG. 11 shows a block diagram for an exemplary implementation of task T240 as shown in FIG. 9.

In task T220, a time of validity $t_g$ is chosen for the set of reference positions to be calculated. This time may be sufficiently in the future to allow for delays in transmission and processing. In task T230, a set of reference positions with respect to $t_g$ is calculated. In task T240, the reference positions within the set are compared to determine whether a potential ambiguity exists. For example, all possible pairs of positions may be tested to ensure that no two positions are closer than a predetermined threshold (e.g. of distance or angle). Alternatively, if the positions are ordered, the task of comparison may be reduced by testing only adjacent positions. FIG. 11 (discussed below) shows an exemplary structure for performing task T240 in this manner.

If a potential ambiguity is indicated, then in task T260 time of validity $t_g$ is adjusted, and tasks T230, T240, and T250 are repeated. For example, task T260 may include incrementing $t_g$ by a predetermined fixed time step. For a GPS application, such a time step may be measurable in milliseconds. In an alternative embodiment, concurrent execution of task T110 may be limited to a maximum number of iterations. In a related embodiment, each set of reference positions may be characterized by a degree of ambiguity, such that upon reaching the maximum number of iterations, a least ambiguous set may be chosen.

In task T120, correction factors are calculated as described above. In task T212, the correction factors are transmitted in a predetermined order, along with time of validity $t_g$ (or information sufficient to indicate $t_g$). In an alternative embodiment, transmission of the correction factors may be delayed according to $t_g$ so that a fixed relation between a time of transmission and a time of validity is maintained. In such case, transmission of information relating to $t_g$ may be omitted.

In a method according to a further embodiment of the invention, a transmitting entity (e.g. a PDE) has knowledge that a receiving entity (e.g. a mobile unit) may use one of several different sets of information (e.g. almanac information) to calculate reference positions, wherein the different sets of information are known sufficiently to the transmitting entity. In such a method, the transmitting entity chooses a time of validity (e.g. through tasks analogous to those described herein) at which none of those sets is expected to yield a potential ambiguity (e.g. in elevation angle order).

FIG. 11 shows a block diagram for an exemplary implementation of task T240 as shown in FIG. 10. A set of reference positions as outputted by task T230 is ordered and available in blocks (e.g. storage elements) 310$i$. Adjacent pairs of these positions are combined (e.g. differenced) in combiners 320$i$, and the results of such comparisons are tested against a threshold in comparators 330$i$. If any pair of the positions is determined to be closer than the threshold, OR gate 340 indicates the detection of a potential ambiguity.

Figure 12:
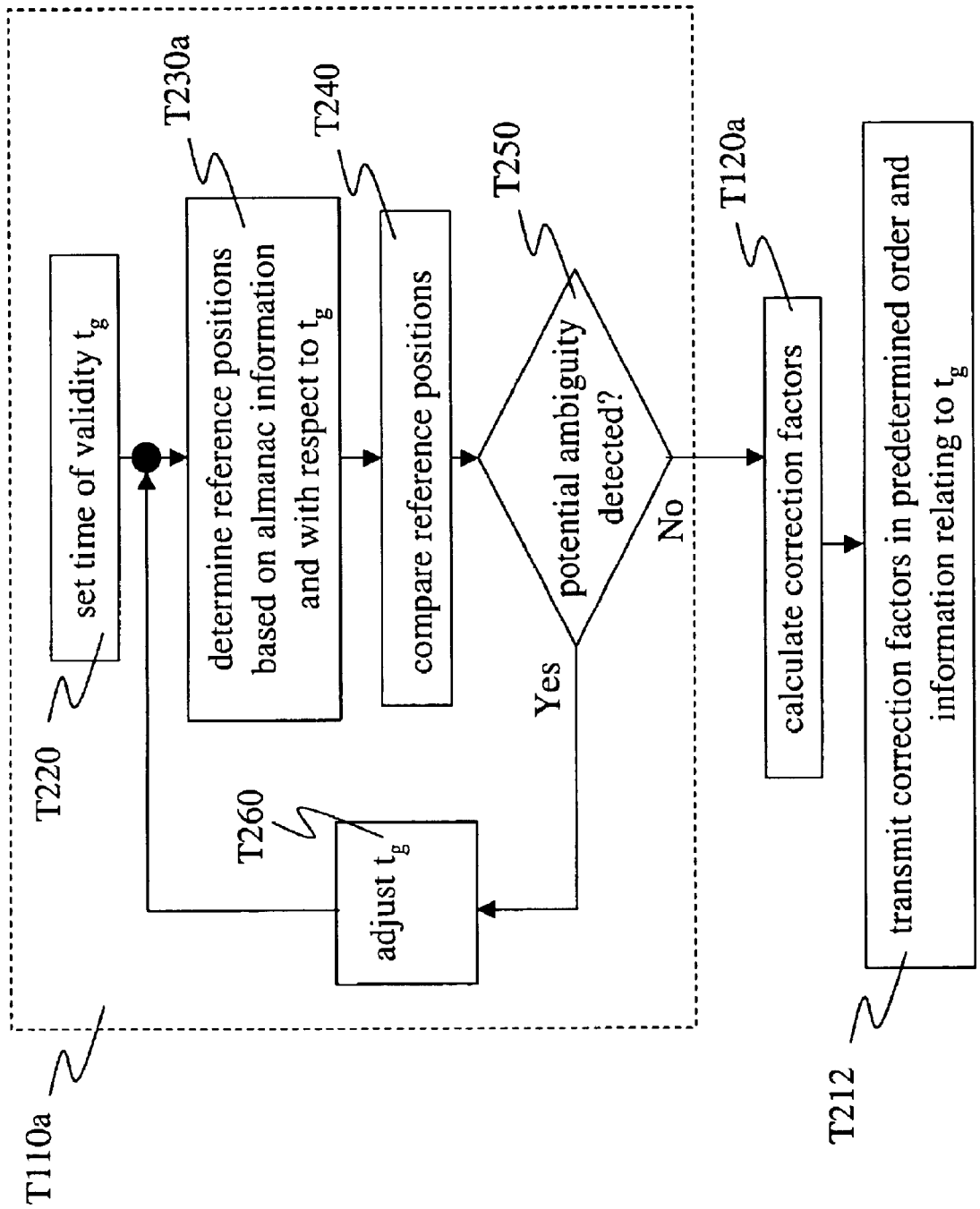
FIG. 12 shows a flowchart for a method according to an embodiment of the invention.

FIG. 12 shows a flowchart for a method according to an embodiment of the invention. In this example, the set of reference positions calculated in task T230$a$ is based on almanac data received from one or more SVs.

A potential ambiguity as described above may also arise with respect to an elevation mask. Only a handful of the SVs of a GPS system are visible at any one time, and an elevation mask may be used to indicate which SVs are visible. If the elevation mask angle is set to be five degrees, for example, then a satellite having an elevation angle of less than five degrees is considered 'not visible'. Because of possible differences in elevation angle determinations by the PDE and a mobile unit as described above, a SV having an elevation angle close to the mask may be deemed 'visible' by one entity but 'not visible' by the other. As a result, the two entities may attach different correspondences between the correction factors and reference positions.

Figure 13:
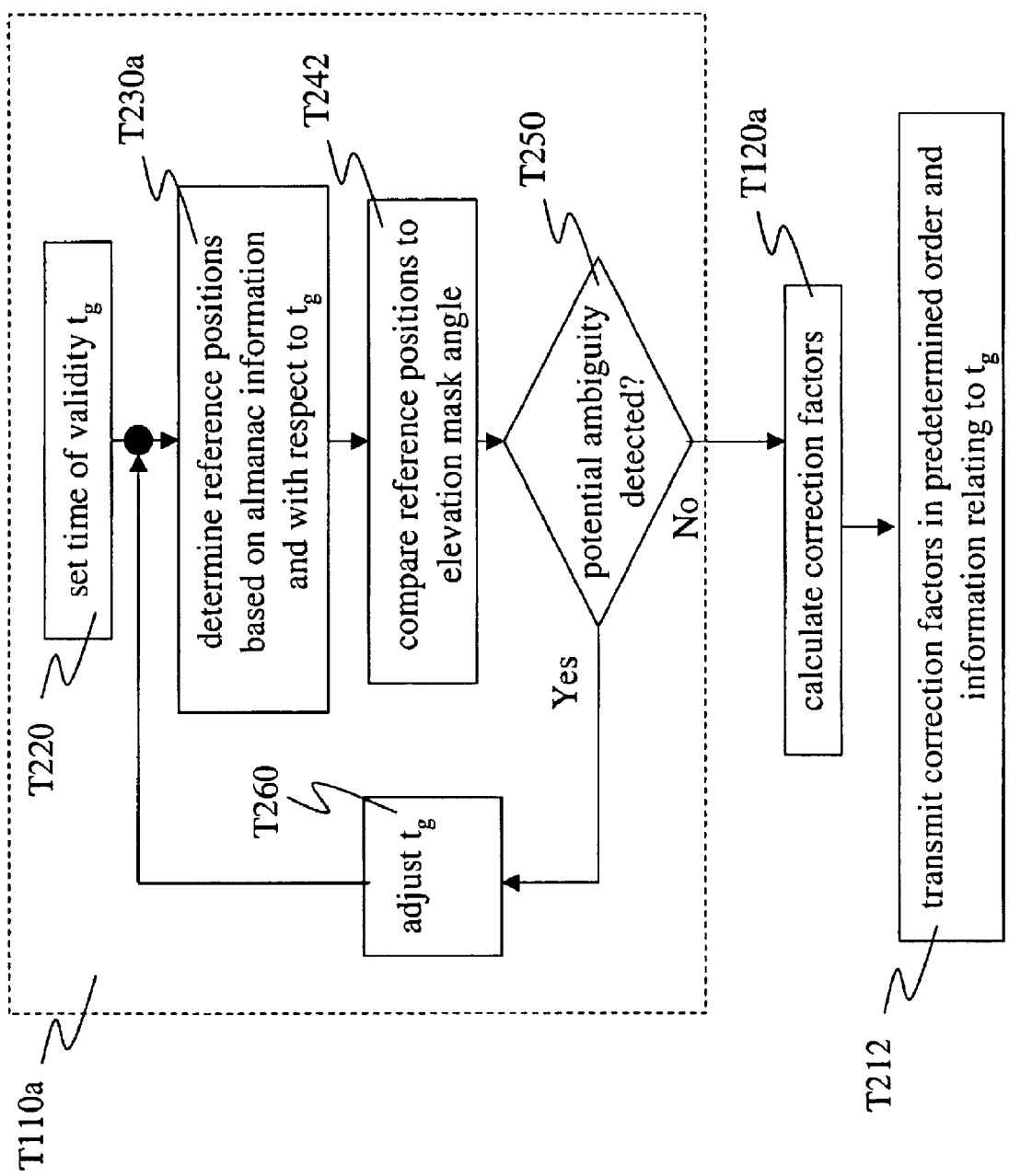
FIG. 13 shows a flowchart for a method according to an embodiment of the invention.
Figure 14:
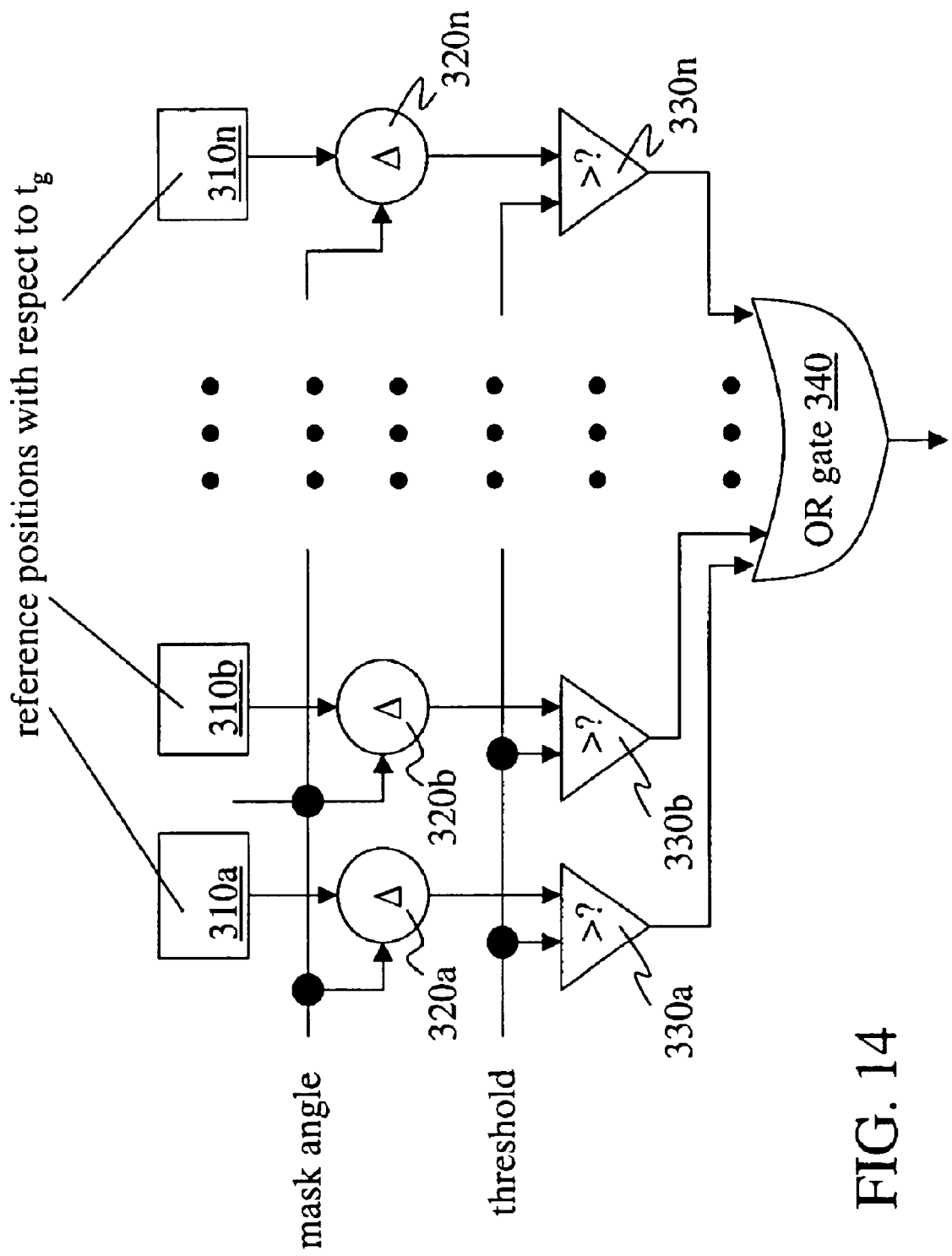
FIG. 14 shows a block diagram for an exemplary implementation of task T242 as shown in FIG. 12.

FIG. 13 shows a flowchart for a method according to an embodiment of the invention. In task T242, the reference positions in each set are compared to the elevation mask angle to determine whether any positions are closer than a predetermined threshold to the mask. FIG. 14 shows a block diagram for an exemplary implementation of task T242 as shown in FIG. 13. In this arrangement, reference positions available in blocks 310$i$ are combined (e.g. differenced) with the mask angle in combiners 320$i$, the results are compared in comparators 330$i$ to a predetermined threshold, and the comparison results are combined in OR gate 340. In an alternative implementation, the reference positions are ordered (e.g. by increasing or decreasing elevation angle) so that it is sufficient to compare the mask angle with only one (e.g. the lowest) or two reference positions (e.g. the closest to each horizon) for each set.

Figure 15:
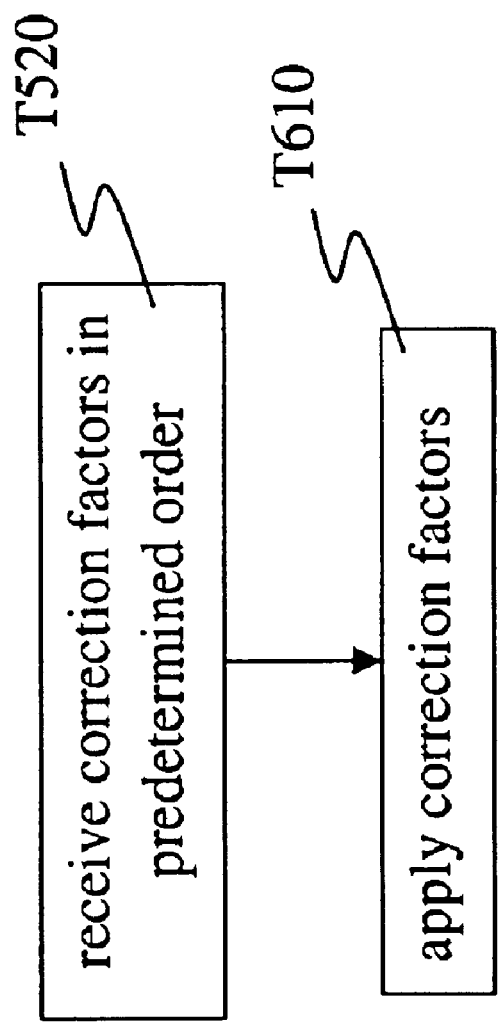
FIG. 15 shows a flowchart for a method according to an embodiment of the invention.

FIG. 15 shows a flowchart for a method according to an embodiment of the invention that may be performed by a receiving entity such as a mobile unit. In task T520, correction factors are received in a predetermined order. In task T610, at least one of the factors is applied (e.g. to correct a reference position).

Figure 16:
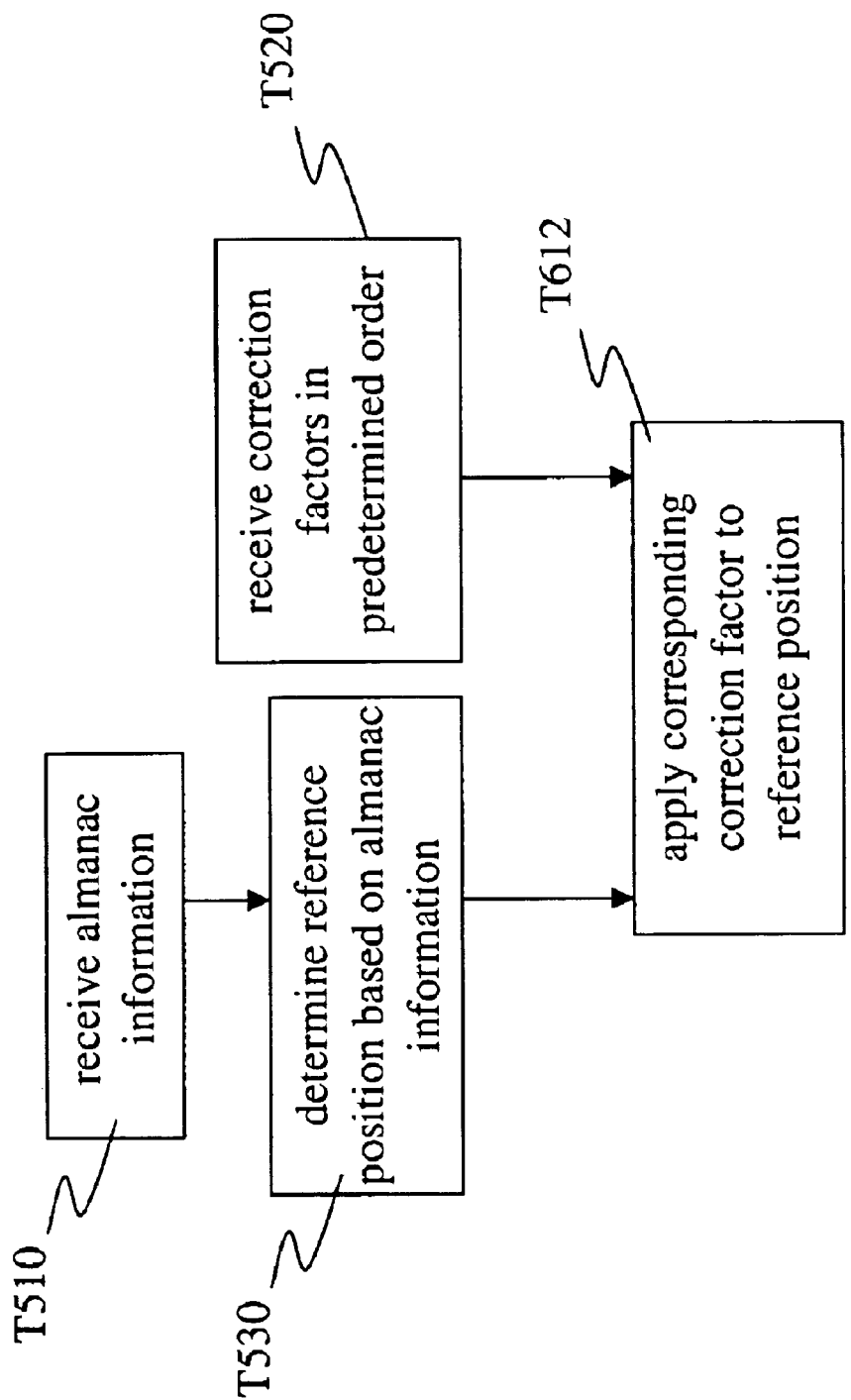
FIG. 16 shows a flowchart for a method according to an embodiment of the invention.

FIG. 16 shows a flowchart for a method according to another embodiment of the invention. In task T510, almanac information is received (e.g. from a PDE or directly via an integrated GPS receiver). In task T530, a reference position for a selected SV is determined based on the almanac information. At the same or a different time, correction factors are received in a predetermined order in task T520. Based on its position within the predetermined order, a correction factor corresponding to the reference position is selected and applied in task T612.

In a method according to another embodiment of the invention, if a receiving entity receives correction factors having a time of validity in the future but determines that the predetermined order may be unambiguously applied to a set of reference positions, the receiving entity may take advantage of the information immediately. For example, by determining what the elevation angles are going to be half a second in the future, a mobile unit can rank order the elevation angles accordingly and then match up the correction factors based on what the elevation angle order will be at that time. From this information, the computed elevation angles can then be adjusted backwards by half a second to obtain their present values.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hardwired circuit, as a circuit configuration fabricated into an application-specific integrated circuit, or as a firmware program loaded into non-volatile memory or a software program loaded from or into a data storage medium as machine-readable code, such code being instructions executable by an array of logic elements such as a microprocessor or other digital signal processing unit. Thus, the present invention is not intended to be limited to the embodiments shown above, any particular sequence of instructions, and/or any particular configuration of hardware but rather is to be accorded the widest scope consistent with the principles and novel features disclosed in any fashion herein.

What is claimed is:

1. A method comprising:
   calculating a plurality of correction factors, each correction factor relating to a position of at least a corresponding one among a set of physical objects; and
   transmitting said plurality of correction factors in a predetermined order, wherein said correspondence of each among said plurality of correction factors with at least one among the set of physical objects is indicated at least in part by said predetermined order;
   wherein said calculating a plurality of correction factors comprises:
   computing a reference position of each among the set of physical objects; and
   computing a supplemental position of each among the set of physical objects, wherein each among said correction factors is based at least in part on a difference between said corresponding reference and supplemental positions.

2. The method according to claim 1, said method further comprising determining the existence of a potential ambiguity between at least two of said reference positions.

3. The method according to claim 2, wherein said potential ambiguity relates to a relation between elevation angles of at least two among the set of physical objects.

4. The method according to claim 2, wherein said potential ambiguity relates to a relation between an elevation mask angle and an elevation angle of at least one among the set of physical objects.

5. The method according to claim 1,
   wherein each among said reference positions is based at least in part on almanac information, and
   wherein each among said supplemental positions is based at least in part on ephemeris information.

6. The method according to claim 5, wherein said almanac information is received from at least one of said space vehicles.

7. An apparatus comprising a data storage medium, said data storage medium having machine-readable code stored thereon including instructions executable by a digital signal processing unit, comprising:

machine readable code for calculating a plurality of correction factors, each correction factor relating to a position of at least a corresponding one among a set of physical objects; and machine readable code for causing said plurality of correction factors to be transmitted in a predetermined order without transmitting information related to identities of said physical objects, wherein said correspondence of each among said plurality of correction factors with at least one among the set of physical objects is indicated at least in part by said predetermined order, and wherein said machine readable code for calculating a plurality of correction factors comprises:

machine readable code for computing a reference position of each among the set of physical objects; and machine readable code for computing a supplemental position of each among the set of physical objects, wherein each among said correction factors is based at least in pert on a difference between said corresponding reference and supplemental positions.

8. An apparatus comprising:

a reference position calculator configured and arranged to calculate a reference position for each among a plurality of physical objects; a supplemental position calculator configured and arranged to calculate a supplemental position for each among the plurality of physical objects; and a correction factor calculator configured and arranged to receive said reference positions and said supplemental positions and to output a plurality of correction factors in a predetermined order, wherein each correction factor relates to a position of at least a corresponding one among the plurality of physical objects, and wherein said correspondence of each among said plurality of correction factors with at least one among the plurality of physical objects is indicated at least in part by said predetermined order.

9. The apparatus according to claim 8, wherein at least one among the set of physical objects is a space vehicle.

10. A system comprising:

a receiver configured and arranged to receive signals from at least one among a plurality of physical objects;

a position determining entity including a reference position calculator configured and arranged to calculate a reference position for each among the plurality of physical objects;

a supplemental position calculator configured and arranged to calculate a supplemental position for each among the plurality of physical objects; and a correction factor calculator configured and arranged to receive said reference positions and said supplemental positions and to output a plurality of correction factors, and a transmitter configured and arranged to transmit the plurality of correction factors, wherein said plurality of correction factors is transmitted in a predetermined order, and wherein each correction factor relates to a position of at least a corresponding one among the plurality of physical objects, and wherein said correspondence of each among said plurality of correction factors with at least one among the plurality of physical objects is indicated at least in part by said predetermined order.

11. The system according to claim 10, wherein at least one among the set of physical objects is a space vehicle.

12. A method comprising:

receiving information relating to positions of respective physical objects;

determining reference positions of said physical objects, said determining being based at least in part on said information;

receiving a plurality of correction factors in a predetermined order without receiving information relating to identities of said physical objects; and correlating said correction factors with respective ones of said reference positions using said predetermined order to identify said respective ones of said physical objects, and applying corresponding correction factors to said reference positions.

13. The method according to claim 12, wherein at least one among the set of physical objects is a space vehicle.

14. A method comprising:

calculating a plurality of correction factors, each correction factor relating to a position of at least a corresponding one among a set of physical objects; and transmitting said plurality of correction factors in a predetermined order, without transmitting information related to identities of said physical objects;

wherein said correspondence of each among said plurality of correction factors with at least one among the set of physical objects is indicated at least in part by said predetermined order;

wherein said calculating a plurality of correction factors comprises:

computing a reference position of each among the set of physical objects; and computing a supplemental position of each among the set of physical objects, wherein each among said correction factors is based at least in part on a difference between said corresponding reference and supplemental positions.

15. The method according to claim 14, said method further comprising determining the existence of a potential ambiguity between at least two of said reference positions.

16. The method according to claim 15, wherein said potential ambiguity relates to a relation between elevation angles of at least two among the set of physical objects.

17. The method according to claim 15, wherein said potential ambiguity relates to a relation between an elevation mask angle and an elevation angle of at least one among the set of physical objects.

18. The method according to claim 14, wherein each among said reference positions is based at least in part on almanac information, and wherein each among said supplemental positions is based at least in part on ephemeris information.

19. The method according to claim 18, wherein said almanac information is received from at least one space vehicle.

20. A method comprising:

calculating a plurality of correction factors, each correction factor relating to a position of at least a corresponding one among a set of physical objects determined by at least a difference between reference and supplemental positions of each among the set of physical objects;

transmitting said plurality of correction factors in a predetermined order;
wherein said correspondence of each among said plurality of correction factors with at least one among the set of physical objects is indicated at least in part by said predetermined order.

21. The method according to claim 20, wherein at least one among said plurality of correction factors relates to a correction to a determination of a position.

22. The method according to claim 20, wherein at least one among said plurality of correction factors relates to a correction to a determination of a position at a predetermined future time.

23. The method according to claim 20, wherein said predetermined order relates to a relative arrangement of the physical objects.

24. The method according to claim 23, wherein said relative arrangement is effective at a future time.

25. The method according to claim 23, wherein said relative arrangement relates to elevation angles of the physical objects.

26. The method according to claim 20, wherein said predetermined order is determined at least in part by a relative order of the elevation angles of the physical objects.

27. The method according to claim 20, wherein at least one among said plurality of correction factors is based at least in part on a signal received from at least one among the set of physical objects.

28. The method according to claim 20, wherein at least one among the set of physical objects is a space vehicle.

29. The method according to claim 20, wherein each among the set of physical objects is a space vehicle, each space vehicle having an identification number relating to a Global Positioning System, and
wherein said predetermined order is determined at least in part by a relative order of the identification numbers of the space vehicles.

30. The method according to claim 20, said method further comprising transmitting information relating to a time of validity of said plurality of correction factors.

31. The method according to claim 20, said method further comprising determining the existence of a potential ambiguity between at least two of said reference positions.

32. The method according to claim 31, wherein said potential ambiguity relates to a relation between elevation angles of at least two among the set of physical objects.

33. The method according to claim 31, wherein said potential ambiguity relates to a relation between an elevation mask angle and an elevation angle of at least one among the set of physical objects.

34. The method according to claim 20,
wherein each among maid reference positions is based at least in part on almanac information, and
wherein each among said supplemental positions is based at least in part on ephemeris information.

35. The method according to claim 34, wherein said almanac information is received from at least one space vehicle.

36. A method comprising:
calculating a plurality of correction factors, each relating to a respective one of a set of satellites; and
transmitting said plurality of correction factors in a predetermined order from a base station to a mobile station;
wherein said predetermined order is known to both said base station and said mobile station; and
wherein a correspondence of each correction factor with each satellite is indicated at least in pan by said predetermined order.

37. The method according to claim 36, wherein at least one among said plurality of correction factors relates to a correction to a determination of a position.

38. The method according to claim 36, wherein at least one among said plurality of correction factors relates to a correction to a determination of a position at a predetermined future time.

39. The method according to claim 36, wherein said predetermined order relates to a relative arrangement of the physical objects.

40. The method according to claim 39, wherein said relative arrangement is effective at a future time.

41. The method according to claim 39, wherein said relative arrangement relates to elevation angles of the physical objects.

42. The method according to claim 36, wherein said predetermined order is determined at least in part by a relative order of the elevation angles of the physical objects.

43. The method according to claim 36, wherein at least one among said plurality of correction factors is based at least in put on a signal received from at least one among the set of physical objects.

44. The method according to claim 36, wherein at least one among the set of physical objects is a space vehicle.

45. The method according to claim 36, wherein each among the set of physical objects is a apace vehicle, each space vehicle having an identification number relating to a Global Positioning System, and
wherein said predetermined order is determined at least in part by a relative order of the identification numbers of the space vehicles.

46. The method according to claim 36, said method further comprising transmitting information relating to a time of validity of said plurality of correction factors.

47. The method according to claim 36, said method further comprising determining the existence of a potential ambiguity between at least two of said reference positions.

48. The method according to claim 47, wherein said potential ambiguity relates to a relation between elevation angles of at least two among the set of physical objects.

49. The method according to claim 47, wherein said potential ambiguity relates to a relation between an elevation mask angle and an elevation angle of at least one among the set of physical objects.

50. The method according to claim 36,
wherein each among said reference positions is based at least in past on almanac information, and
wherein each among said supplemental positions is based at least in part an ephemeris information.

51. The method according to claim 50, wherein said almanac information is received from at least one space vehicle.

52. A system for transmitting a plurality of correction factors to a mobile station configured to receive said correction factors, and to associate said correction factors with particular satellite signals in dependence upon a predetermined order that said correction factors are received and to use said correction factors in a determination of a location of said mobile station, comprising:
a base station at a fixed location for receiving signals from a plurality of satellites;
a position determining entity associated with said base station, including:

a reference position calculator for calculating a reference position for each of said satellites from said signals;

a supplemental position calculator for calculating a supplemental position for each of said satellites from said signals;

a correction factor calculator for producing a respective plurality of correction factors for each of said satellites from said reference and supplemental positions; sad means for arranging said correction factors in a predetermined order with respect to respective identities of said satellites; and a transmitter associated with said base station for transmitting the plurality of correction factors.

53. The system of claim 52 wherein said means for arranging said correction factors in a predetermined order with respect to respective identities of said satellites arranges said correction factors in an order of ascending azimuth angle of said satellites.

54. The system of claim 52 wherein said means for arranging said correction factors in a predetermined order with respect to respective identities of said satellites arranges said correction factors in an order of descending azimuth angle of said satellites.

* * * * *